Patented Nov. 7, 1922.

1,434,749

UNITED STATES PATENT OFFICE.

HERMANN PLAUSON, OF HAMBURG, GERMANY.

PROCESS FOR THE MANUFACTURE OF A PHOSPHATIC MANURE.

No Drawing.      Application filed February 12, 1921. Serial No. 444,498.

*To all whom it may concern:*

Be it known that I, HERMANN PLAUSON, Esthonian subject, residing at Hamburg, Germany, have invented certain new and useful Processes for the Manufacture of a Phosphatic Manure, of which the following is a specification.

It is well known that the humic acids of the soil gradually decompose insoluble phosphates but the process is exceedingly slow. It has been proposed to accelerate this action by mixing humic bodies with alkali and rock phosphate and allowing the mixture to stand in heaps or subjecting it to chemical or electrolytic treatment.

It has now been found possible to obtain a better result by subjecting insoluble phosphates to intensive mechanical disintegrative action in presence of bodies yielding humic acid, e. g., with a mixture of bituminous brown coal or peat with alkali. This mechanical treatment, if sufficiently vigorous, colloidalizes the phosphates and allows the reaction to occur rapidly, giving a product which may be regarded as a double compound of calcium humate and alkali phosphate, which is very rapidly assimilable by plants. The process avoids the use of heat and of large quantities of sulphuric acid which is normally used in the manufacture of superphosphates.

The following example will illustrate the process.

100 parts of bituminous brown coal are taken of a kind which is entirely or almost entirely soluble in alkali. This is treated with 100 parts of Thomas phosphate meal and 30–50 parts of caustic potash or caustic soda liquor in a high speed disintegrating mill preferably of the type described in my copending application Serial No. 437,117, filed January 13th, 1921 (Case 14), at a temperature of 20–100° C. for from one half to one hour. Carbon dioxide preferably in the form of furnace gases is then blown through the mixture so obtained to neutralize it and separate out the humic acid. The mixture so obtained is separated from the excess of water by filtration or centrifugalization and dried. A product is obtained which appears to be partly a mixture of humic acid, the calcium salt and/or the potassium salt thereof, and superphosphate, but partly a double compound of the calcium salt of humic acid with alkali phosphate. The manure so obtained is very readily taken up by plants and is easy to distribute. It can however be applied by special apparatus direct to the land in the form of concentrated liquid which avoids the annoying dust which is produced on distributing a powder. Other insoluble phosphates can be used instead of Thomas phosphate meal. The neutralization can also be effected with waste acid from the manufacture of sulphuric acid, nitric acid, acetic acid, or citric acid.

Having now particularly described and ascertained the nature of my said invention and in what manner the same is to be performed, I declare that what I claim is:—

1. Process for the manufacture of phosphatic manure which comprises subjecting insoluble phosphates to very intensive mechanical disintegrative action in presence of water and of ingredients containing humic acid.

2. Process for the manufacture of phosphatic manure which comprises subjecting insoluble phosphates to very intensive mechanical disintegrative action in presence of water, brown coal and alkali.

In witness whereof, I have hereunto signed my name this 26th day of January, 1921.

HERMANN PLAUSON.